(12) United States Patent
Fujimoto et al.

(10) Patent No.: US 8,660,411 B2
(45) Date of Patent: Feb. 25, 2014

(54) DISPLAY DEVICE

(75) Inventors: Takaomi Fujimoto, Osaka (JP); Takashi Watanabe, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 185 days.

(21) Appl. No.: 13/383,111

(22) PCT Filed: Jul. 7, 2010

(86) PCT No.: PCT/JP2010/061506
§ 371 (c)(1),
(2), (4) Date: Feb. 23, 2012

(87) PCT Pub. No.: WO2011/004830
PCT Pub. Date: Jan. 13, 2011

(65) Prior Publication Data
US 2012/0141091 A1  Jun. 7, 2012

(30) Foreign Application Priority Data

Jul. 10, 2009  (JP) ................................. 2009-163794

(51) Int. Cl.
*H04N 5/76* (2006.01)
*H04N 5/765* (2006.01)

(52) U.S. Cl.
USPC ......................................... 386/291; 386/200

(58) Field of Classification Search
None
See application file for complete search history.

(56) References Cited

U.S. PATENT DOCUMENTS

| | | | | |
|---|---|---|---|---|
| 5,734,444 A | * | 3/1998 | Yoshinobu | ...................... 725/14 |
| 6,166,778 A | | 12/2000 | Yamamoto et al. | |
| 2005/0198670 A1 | | 9/2005 | Nishimoto | |
| 2008/0172697 A1 | | 7/2008 | Hanashima et al. | |
| 2008/0235726 A1 | | 9/2008 | Sakao et al. | |
| 2009/0055874 A1 | * | 2/2009 | Yamamoto | ..................... 725/58 |
| 2010/0017571 A1 | | 1/2010 | Nakaji et al. | |

FOREIGN PATENT DOCUMENTS

| | | |
|---|---|---|
| JP | 9-270673 A | 10/1997 |
| JP | 11-308539 A | 11/1999 |
| JP | 2000-215547 A | 8/2000 |
| JP | 2001-197411 A | 7/2001 |
| JP | 2002-10151 A | 1/2002 |
| JP | 2004-15632 A | 1/2004 |
| JP | 2005-252764 A | 9/2005 |
| JP | 2005-312024 A | 11/2005 |

(Continued)

OTHER PUBLICATIONS

International Search Report, dated Oct. 19, 2010 in PCT/JP2010/061506.

(Continued)

*Primary Examiner* — William C Vaughn, Jr.
*Assistant Examiner* — Asher Khan
(74) *Attorney, Agent, or Firm* — Birch, Stewart, Kolasch & Birch, LLP (57) ABSTRACT

Disclosed is a display device that makes recording and scheduling programs chosen by a user simpler than was conventionally possible. While viewing a broadcast program of any channel on the display device, a user gives an instruction for different-channel program guide display (S1). The display device displays different-channel programs broadcasted at the time as a list (S2). In that state, the user presses down the cursor button of a remote controller (S3), the position of the cursor is changed (S4), and the user press down a record button (45) (S5) to start recording the program at the cursor position (S6).

3 Claims, 9 Drawing Sheets

(56) References Cited

FOREIGN PATENT DOCUMENTS

| | | |
|---|---|---|
| JP | 2006-115228 A | 4/2006 |
| JP | 2006115052 A | 4/2006 |
| JP | 2006-180058 A | 7/2006 |
| JP | 2007-115294 A | 5/2007 |
| JP | 2008-34896 A | 2/2008 |
| JP | 2008-85851 A | 4/2008 |
| JP | 2008-199578 A | 8/2008 |
| JP | 2008-236688 A | 10/2008 |
| JP | 2009-81573 A | 4/2009 |

OTHER PUBLICATIONS

English computer translation of JP-2000-215547-A.
English computer translation of JP-2001-197411-A.
English computer translation of JP-2002-01051-A.
English computer translation of JP-2004-15632-A.
English computer translation of JP-2006-115052-A.
English computer translation of JP-2007-115294-A.
English computer translation of JP-2008-34896-A.
English computer translation of JP-2009-81573-A.

* cited by examiner

DISPLAY DEVICE

TECHNICAL FIELD

The present invention relates to a display device, and, more particularly, to a display device having a function of receiving and displaying a broadcast signal as well as recording the received broadcast signal.

BACKGROUND ART

A display device, for example, a liquid-crystal television is generally connected to and used with a recording/reproducing apparatus for recording and reproducing a received broadcast signal. Recently, a display device such as a liquid-crystal television is provided that is configured to include a recording unit having a recording function built into the main body.

With regard to the number of broadcast programs to be recorded, contents are diversified as the number of the programs increases, and a large number of programs are broadcasted that suit the user's preferences. Therefore, a recording reservation function is generally used for certainly recording a program that suits the user's preferences from a large number of programs without overlooking. In the recording reservation function, by acquiring information of an electronic program guide (EPG) from broadcast wave, a user generally selects a program that suits the preferences in advance from program titles etc., to make a recording reservation. On this occasion, a technique is known that searches for a keyword or a genre included in EPG to automatically record a program that suits the user's preferences (see. e.g., Patent Document 1). A technique is also known that automatically records a program including a keyword or ID in common with a program recorded in the past (see. e.g., Patent Document 2).

PRIOR ART DOCUMENTS

Patent Documents

Patent Document 1: Japanese Laid-Open Patent Publication No. 2005-312024
Patent Document 2: Japanese Laid-Open Patent Publication No. 2006-180058

SUMMARY OF THE INVENTION

Problem to be Solved by the Invention

With regard to techniques for utilizing a recording reservation function to make a recording reservation from various programs received by a display device as described above, various conventional techniques have been proposed and disclosed.

However, if it is desired to start recording a currently broadcasted program in real time, a user generally operates a recording button of a remote controller etc., to start recording while previewing the program. In this situation, recording of a program can be started by operating the recording button only for the program currently displayed on the display device. If a different-channel program not currently displayed is recorded, a plurality of operations must be performed such as displaying a dedicated different-channel program guide etc., selecting a desired program from the different-channel program guide, and starting recording of the selected program, for example, and these operations are complicated.

When a recording reservation is made, operations such as displaying the electronic program guide before selecting a desired program and making a recording reservation of the selected program are necessary, and the recording reservation operation is complicated in itself.

The present invention was conceived in view of the situations and it is therefore an object of the present invention to provide a display device enabling recording or reservation of a user's desired program to be performed with an operation easier than before in the display device having a function of recording a received broadcast signal.

Means for Solving the Problem

To solve the problems, a first technical means is a display device comprising: a displaying portion that displays an input video; a display control portion that controls display of the displaying portion; a broadcast signal receiving portion that receives a broadcast signal; a recording portion that records the broadcast signal received by the broadcast signal receiving portion; a recording control portion that controls recording of the broadcast signal into the recording portion; and an operation input portion that accepts an operation input by a user, wherein when the displaying portion displays a program of the broadcast signal received by the broadcast signal receiving portion, the displaying control portion displays different-channel program information of the program displayed on the displaying portion as a list on the displaying portion in accordance with an operation input to the operation input portion, and wherein when a certain different-channel program is selected from the listed different-channel program information and an instruction for recording is given in accordance with an operation input to the operation input portion, the recording control portion records the selected different-channel program in the recording portion.

A second technical means is a display device comprising: a displaying portion that displays an input video; a display control portion that controls display of the displaying portion; a broadcast signal receiving portion that receives a broadcast signal; a recording portion that records the broadcast signal received by the broadcast signal receiving portion; a recording control portion that controls recording of the broadcast signal into the recording portion; an operation input portion that accepts an operation input by a user; a program information recording portion that records program information of the broadcast signal when recording of the broadcast signal is started in accordance with an operation input to the operation input portion; and a high-frequency program information recording portion that records highly frequently recorded program information, wherein when the recording of the broadcast signal is started, the recording control portion compares program information of the broadcast signal starting to be recorded with program information recorded in the program information recording portion, and records the program information of the broadcast signal starting to be recorded in the high-frequency program information recording portion when it is determined that the pieces of the program information are matched in accordance with a predetermined condition, wherein when a selected program displayed on the display device is changed in accordance with an operation input to the operation input portion, the display control portion compares program information of a program after selection with program information recorded in the high-frequency program information recording portion, and displays on the displaying portion a display screen indicating that the program after the selection is a highly frequently recorded program when it is determined that the pieces of the program information are matched in accordance with a predetermined condition.

A third technical means is the display device as defined in the second technical means, wherein the program information is one or more of program title information, program content information, and genre information provided as service information of digital broadcast.

A fourth technical means is the display device as defined in the second technical means, wherein the program information is one or more of program title information, program content information, and genre information acquired by reproducing a recording medium capable of communicating with the display device.

A thirteenth technical means is a display method executed by a display device including a displaying portion that displays an input video, a display control portion that controls display of the displaying portion, a broadcast signal receiving portion that receives a broadcast signal, a recording portion that records the broadcast signal received by the broadcast signal receiving portion, a recording control portion that controls recording of the broadcast signal into the recording portion, and an operation input portion that accepts an operation input by a user, wherein the method comprises: a step of causing the displaying control portion to display different-channel program information of the program displayed on the displaying portion as a list on the displaying portion in accordance with an operation input to the operation input portion when the displaying portion displays a program of the broadcast signal received by the broadcast signal receiving portion, and a step of causing the recording control portion to record the selected different-channel program in the recording portion when a certain different-channel program is selected from the listed different-channel program information and an instruction for recording is given in accordance with an operation input to the operation input portion.

Effect of the Invention

According to the present invention, the display device can be provided that enables recording or reservation of a user's desired program to be performed with an operation easier than before in the display device having a function of recording a received broadcast signal.

MODES FOR CARRYING OUT THE INVENTION

Figure 1:
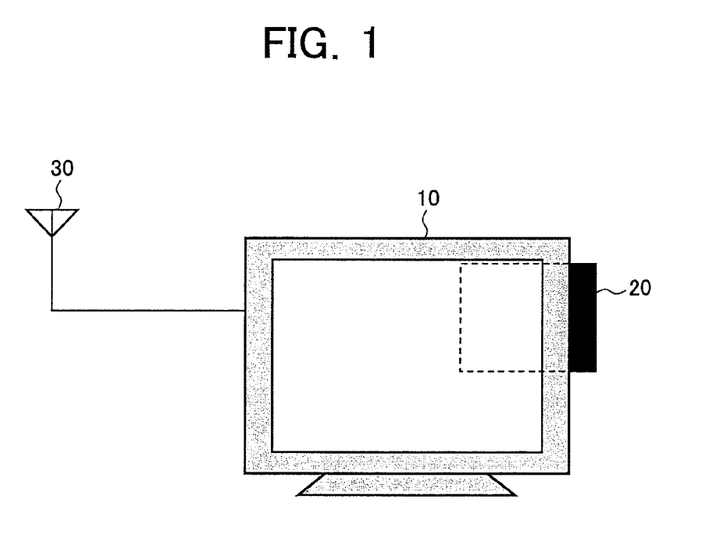
FIG. 1 is a schematic for explaining one embodiment of a display device according to the present invention.

FIG. 1 is a schematic for explaining one embodiment of a display device according to the present invention. A display device 10 of this embodiment is configured as a television (TV) and a recording unit portion 20 is built into the inside of the television. The display device 10 can record a broadcast signal received via an antenna 30 into a predetermined recording medium mounted on the recording unit portion 20. The recorded broadcast signal can be reproduced as needed to display a video on a television screen. Although, for example, BD (Blu-ray Disc) is applicable to the recording medium, this is not a limitation of a type of recording medium, and the recording/reproduction may be performed with a disc-type recording medium such as DVD and CD, various memory cards such as USB (Universal Serial Bus) memory and SD card, and a stationary-type recording medium such as HD (Hard Disk). An example of using BD as the recording medium will hereinafter be described.

Figure 2:
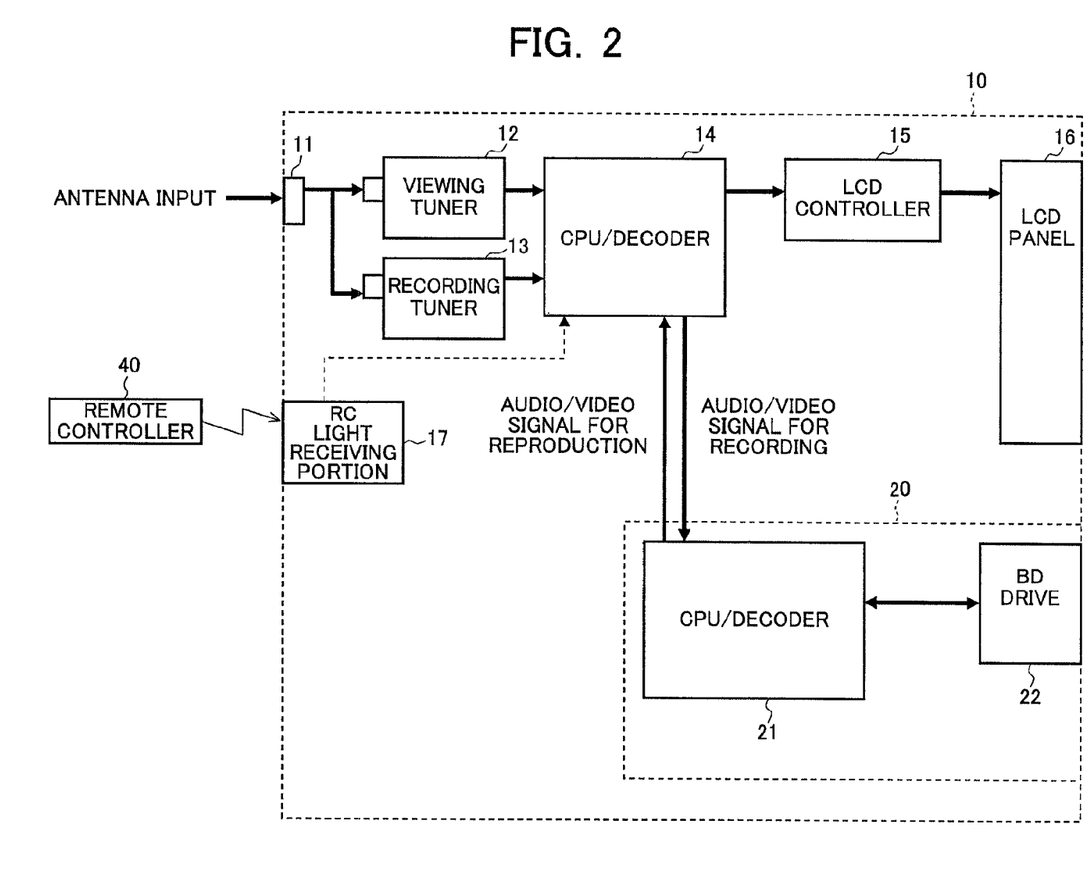
FIG. 2 is a block diagram for explaining a main configuration in the one embodiment of the display device according to the present invention.

FIG. 2 is a block diagram for explaining a main configuration in the one embodiment of the display device according to the present invention.

The display device 10 includes a remote controller (RC) light receiving portion 17 to receive and transmit a remote control signal sent out from a remote controller 40 operated by a user to a CPU/decoder 14. The CPU/decoder 14 processes user's instruction information sent out from the remote controller 40 and controls peripheral devices to provide control of executing functions such as viewing, recording, etc., in the display device 10.

The display device 10 is equipped with two tuners; one is a viewing tuner 12 used for previewing a broadcast program on the display device 10; and the other is a recording tuner 13 used for recording a broadcast program. These two tuners 12, 13 enable simultaneous recording while a broadcast signal is viewed on the display device. Each of the tuners 12, 13 is configured as a front end portion including circuits such as a tuner circuit that selects a channel of a broadcast signal, an IF demodulation circuit, and a DC-DC converter.

When a received broadcast signal is viewed, the CPU/decoder 14 controls the viewing tuner 12 to select and demodulate an instructed channel in accordance with the instruction information from a user sent out from the remote controller 40. A broadcast signal input to an antenna input terminal 11 and output from the viewing tuner 12 is decoded by the CPU/decoder 14, converted by an LCD controller 15 into a signal for driving an LCD (liquid-crystal display) panel 16, and displayed on the LCD panel 16. An audio signal is output as sound from speakers by an audio output means (not depicted).

The CPU/decoder 14 can generate an OSD signal to be displayed as OSD (On Screen Display) on the LCD panel 16 to combine and output the OSD signal with a decoded video signal to the LCD controller 15. The OSD display is used for displaying various menus and displaying a different-channel program guide, for example.

When a broadcast program is recorded, the CPU/decoder 14 controls the recording tuner 13 to select an indicated channel in accordance with the instruction information from a user sent out from the remote controller 40 and performs demodulation. A broadcast signal (audio/video signal for recording) output from the recording tuner 13 is sent through the CPU/decoder 14 to a recording unit portion 20. The recording unit portion 20 decodes the broadcast signal with a CPU/decoder 21 and records the broadcast signal into a BD medium with a BD drive 22. If the received broadcast signal is subjected to rate conversion and recorded, the recording unit portion 20 may be driven to execute processing such as inversely quantizing compression-coded video data with a transcoder and changing a quantization step to perform re-quantization.

In this example, the recording unit portion 20 is configured as a module built into the display device 10. The recording unit portion 20 is configured to include a control means made up of the CPU/decoder 21 in the module of the recording unit portion 20 separately from the CPU/decoder 14 of the display device 10 so as to decode recorded contents with the control means. In this case, even the recording module built into the display device 10 may be considered and controlled as one of external connection devices for the display device 10.

If a recorded program etc., recorded in BD mounted on the recording unit portion 20 are reproduced, after the data of the recorded program etc., recorded in the BD is decoded by the CPU/decoder 21, the video data is converted into a video signal in a format available for video output and is output through the CPU/decoder 14 to the LCD controller 15, and the audio data is converted into an audio signal in a format available for audio output and is output to the audio output means (not depicted) in synchronization with the video.

The display device 10 includes an input/output I/F (not depicted) and connects an external device such as a recording device to enable input/output of a video/audio stream and a control signal from/to the external device. The video/audio stream can be transmitted through I/F based on standards such as HDMI (High-Definition Multimedia Interface) and IEEE 1394, for example. The display device 10 may additionally use I/F to which D-terminals, S-terminals, pin terminals, etc., are applied. For the control signal for controlling the external device, control commands based on the HDMI standard and the IEEE 1394 standard can be used. Video/audio signals input through such an input/output I/F can be recorded on BD or data recorded on BD can be reproduced and output through the input/output I/F to the external device.

The present invention includes a displaying portion that displays an input video, a display control portion that control display of the displaying portion, a broadcast signal receiving portion that receives a broadcast signal, a recording portion that records the broadcast signal received by the broadcast signal receiving portion, a recording control portion that controls the recording of the broadcast signal into the recording portion, and an operation input portion that accepts an operation input by a user; in the exemplary configuration of FIG. 2, the displaying portion corresponds to the LCD panel 16; the display control portion corresponds to the CPI/decoder 14 and the LCD panel 16; and the broadcast signal receiving portion corresponds to the viewing tuner 12 and the recording tuner 13. The recording control portion corresponds to the CPU/decoder 21 and the BD drive 22 of FIG. 2, and the operation input portion corresponds to the remote controller 40 and the remote controller light receiving portion 17.

OPERATION EXAMPLE 1

A first operation example according to the present invention of the display device including the configuration described above will be described. In this operation example, while a broadcast program is viewed on the display device 10, recording of a desired broadcast program can be started with fewer operations by displaying information of different-channel programs broadcasted at the time as a list, selecting a user's desired broadcast program from the display, and operating a recording button of a remote controller.

Figure 3:
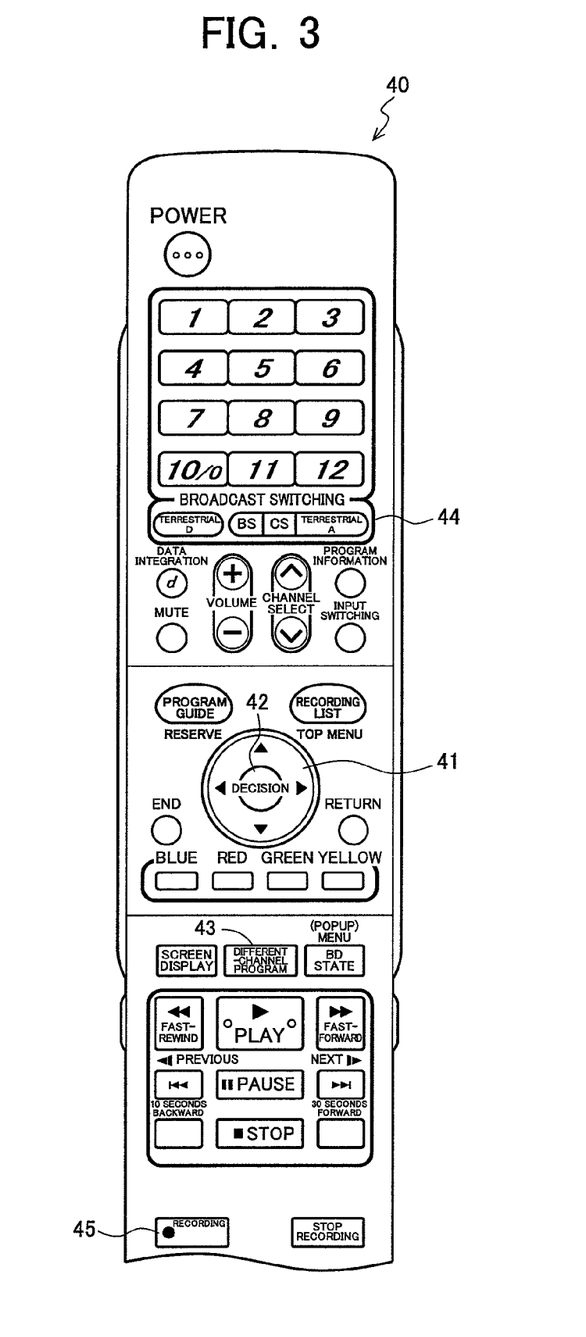
FIG. 3 is a diagram for explaining a first operation control example in the display device according to the present invention.

FIG. 3 is a diagram of an exemplary configuration of operation buttons of the remote controller included in the display device of the present invention. The remote controller 40 is provided with a cursor button 41 for moving a cursor displayed on the display device 10 during menu operation etc., a decision button 42 for deciding various operations, a different-channel program button 43 for displaying a different-channel program guide while a broadcast program is viewed, a broadcast switching button 44 for switching terrestrial digital, BS, and CS broadcasts, etc., and a recording button 45 for starting recording of a selected broadcast program.

Figure 4:
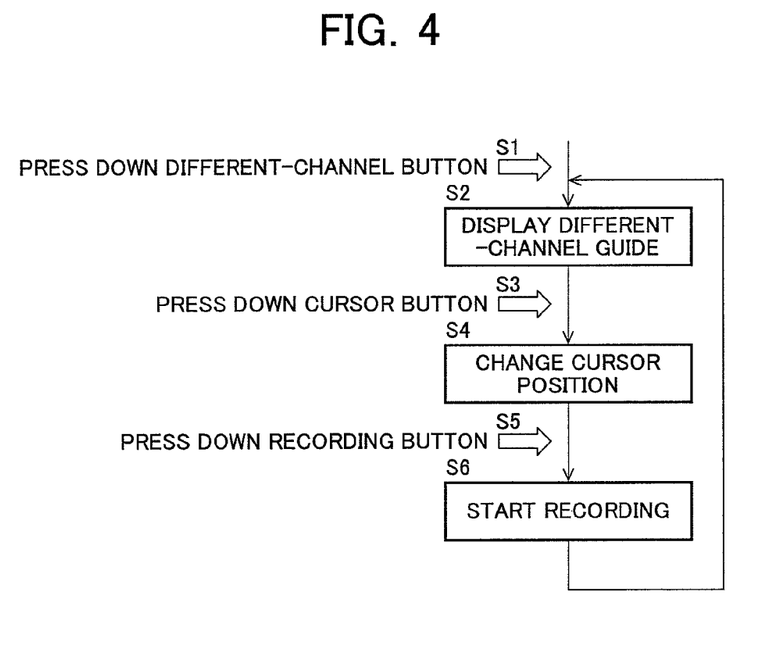
FIG. 4 is a diagram for explaining the first operation control example in the display device according to the present invention.

FIG. 4 is a diagram for explaining the first operation control example in the display device according to the present invention. While viewing a broadcast program of any channel on the display device 10, a user can give an instruction for different-channel program guide display (step S1). The instruction for the different-channel program guide display can be given by pressing down the different-channel program button 43 of the remote controller 40.

In response to the instruction information caused by the pressing down the different-channel program button 43, the CPU/decoder 14 of the display device 10 displays different-channel programs broadcasted at the time, i.e., programs of viewable broadcast channels other than the currently viewed channel as a list (step S2). The different-channel program guide at this time is generated from an electronic program guide acquirable from broadcast wave. The electronic program guide may not only be acquired from the broadcast wave but also be an electronic program guide acquirable from the Internet etc.

Figure 5:
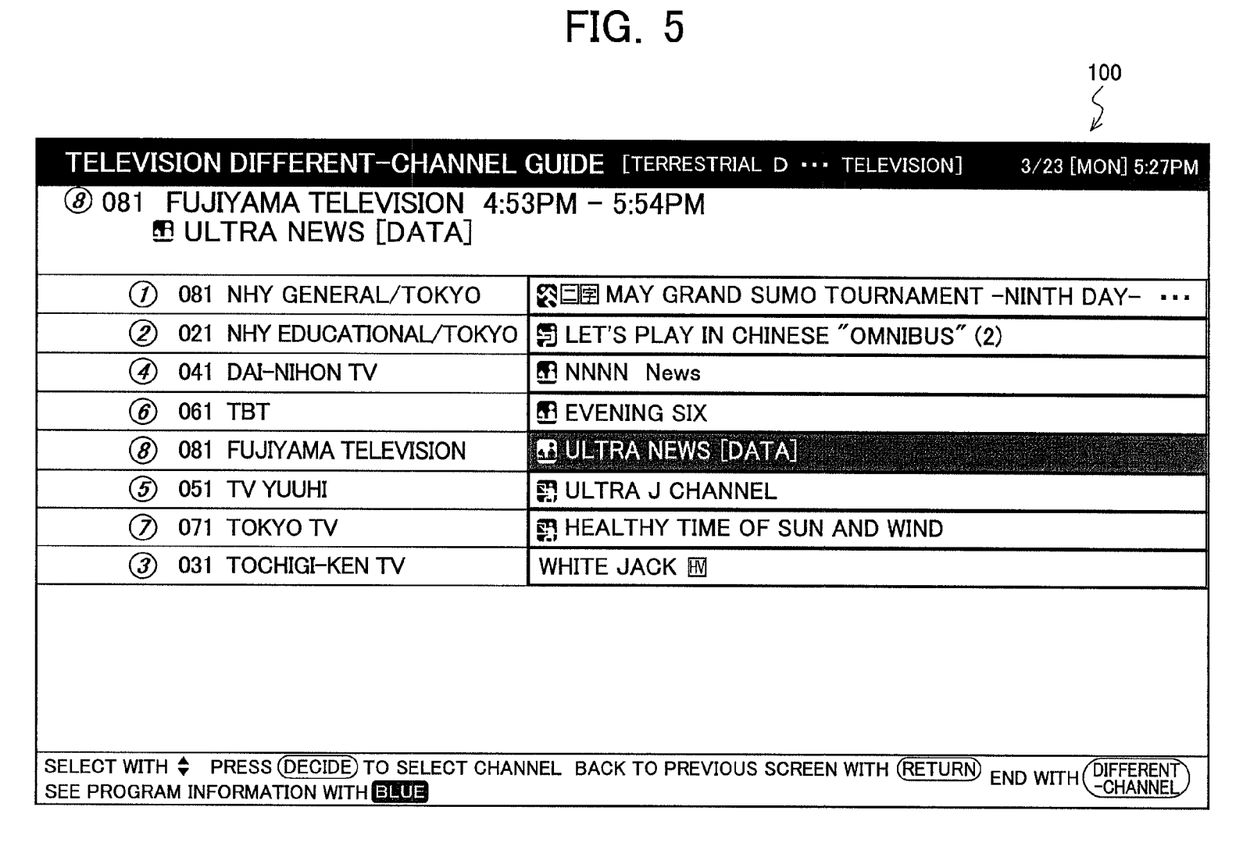
FIG. 5 is a diagram of an example of a different-channel program guide displayed on the display device according to the present invention.

FIG. 5 is a diagram of an example of the different-channel program guide displayed at step S2 described above. As described in FIG. 4, if a user presses down the different-channel program button 43 of the remote controller 40 while viewing any broadcast program on the display device, the different-channel program guide as depicted in FIG. 5 is displayed. The different-channel program guide displays currently viewable channels of different-channel programs, service names (broadcast stations), program names (event names), etc., as a list, and the user can select a desired program with a cursor by using the cursor button 41 included in the remote controller 40. By pressing down the broadcast switching button 44 of the remote controller 40 while the different-channel program guide is displayed, the display can be switched to display of different-channel programs of another network or medium.

Returning to FIG. 4, the description will be continued. While the different-channel program guide is displayed at step S2, the user presses down the cursor button 41 of the remote controller 40 (step S3) to change the cursor position (step S4). In this example, the cursor is in a state of selecting any program displayed on the different-channel program guide, and the selection position is changed upon pressing down the cursor button.

When the cursor is moved to a desired channel, the user can press down the recording button 45 included in the remote controller 40 (step S5) to start recording the program at the cursor position (step S6).

In a conventional function, to record a program on the different-channel program guide, the different-channel program guide 100 as depicted in FIG. 5 is displayed while a certain broadcast program is previewed; a user's desired channel is selected by the cursor button 41; and the decision button 42 is pressed down to switch the display to the selected program. Recording of the displayed program can be started by pressing down the recording button 45 at this point. On the other hand, in this embodiment according to the present invention, while the different-channel program guide 100 is displayed, the recording of a program can be started by only selecting the program and pressing the recording button 45 and, therefore, the recording of the desired program can easily be started with fewer operations.

OPERATION EXAMPLE 2

In this operation example, the display device 10 stores and retains a title and a program content of a recorded program when recording is executed and, refers to the storage contents when a program is selected in the display device 10 and, if it is determined that the program is usually frequently recorded by a user, the display device 10 automatically starts recording the program after the selection or change.

Figure 6:
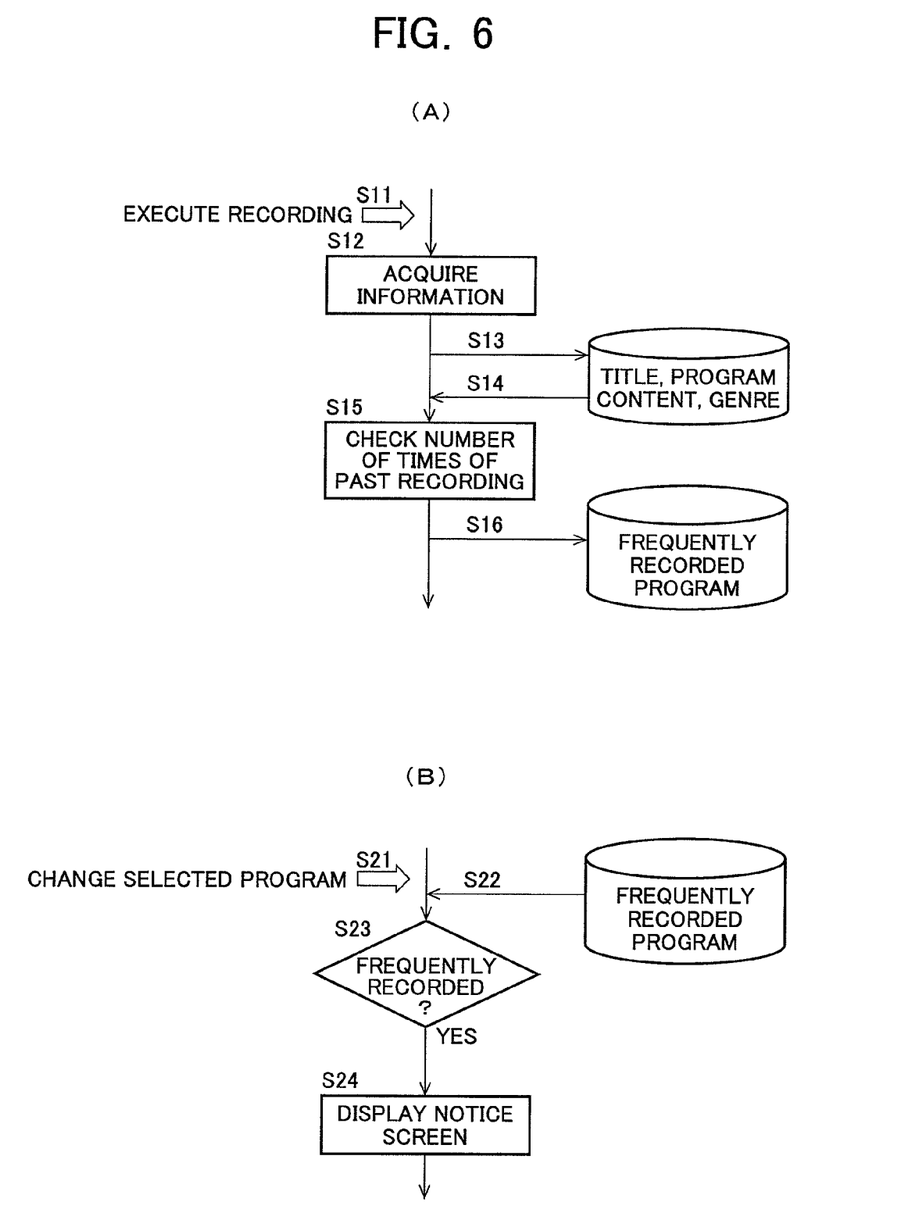
FIG. 6 is a diagram for explaining a second operation control example in the display device according to the present invention.

FIG. 6 is a diagram for explaining a second operation control example in the display device according to the present invention, FIG. 6(A) is a diagram for explaining an operation example when recording is executed and FIG. 6(B) is a diagram for explaining an operation example when a selected program is changed.

In FIG. 6(A), if it is instructed to execute recording in the display device 10 (step S11), the display device 10 acquires information from a program to be recorded (step S12). In this case, this information may be a program title, program content information, and genre information included as service information in broadcast wave or one or more of these pieces of the information. The program information may be a program title, program content information, and genre information acquired by reproducing a recording medium capable of communicating with the display device 10, for example, a recording medium such as BD and DVD or a recording medium such as HD (hard disk), flash memory, and USB memory, or one or more of these pieces of the information. The program information may be information determined in advance as needed other than the program title, the program content information, and the genre information. For example, a program start time, a program end time, program viewing appropriateness information, etc., may be used that are provided as service information of digital broadcast.

The display device 10 stores and retains the information acquired from the broadcast wave into a storage means (corresponding to a program information recording portion of the present invention) such as a memory included in the display device 10 (step S13) and reads the information already stored in the storage means (step S14) to check the number of times of past recording (step S15). In this case, the program title, the program content information, and the genre information recorded this time are compared with the program title, the program content information, and the genre information stored in the storage means and, if one or more pieces of the information are matched, the display device 10 determines that a program of the same type is recorded and checks the number of times that a program of the same type is recorded.

To determine whether a program title is matched, it may be determined that the program title is matched if the program title is perfectly matched, or it may be determined that the program title is matched if the program title is partially matched. In the case of partial matching, it may be determined whether the program title is matched for a predetermined amount or more of characters. Although the same applies to the program content information, it may be determined that the program content information is matched when a predetermined keyword is matched in the case of the program content information, for example.

In the case of the genre information, since a genre is represented by a certain genre code, it may be determined whether the genre code is matched. When a large classification and a middle classification of a genre code are matched, it may also be determined that the genre code is matched. The number of times of past recording is checked for the program having one or more (in accordance with a predetermined criterion) of the program title, the program content, and the genre matched in accordance with a predetermined criterion and, if the program is recorded in the past for the predetermined number of times, the information of the program is stored as of frequently recorded program information into a storage means (corresponding to a high-frequency program information recording portion) such as a memory. A program title, a program content, and genre information may be used as the frequently recorded program information. The process at the time of recording is terminated as above.

The operation example at the time of changing a selected program will then be described with reference to FIG. 6(B). If a user operates the remote controller 40 to perform an operation of selecting a program to start viewing or perform an operation of changing a selected program being viewed (step S21), the display device 10 refers to the frequently recorded program information stored in the storage means (step S22) to determine whether the program after the selection matches a frequently recorded program (step S23).

Whether the program after the selection matches the frequently recorded program is determined by using the program title and the program information of the program after the selection acquired from broadcast wave and the genre information acquired from the broadcast wave of the program after the selection, comparing these pieces of information with the frequently recorded program information in the storage means, and determined whether these pieces of information are matched. Whether matching of each piece of information is acceptable can be determined in accordance with the same criterion as the determination of matching at step S15 described above.

If it is determined at step S23 that the program after the selection is the program frequently recorded in the past, a notice screen prepared in advance is displayed on the LCD panel 16 of the display device 10 (step S24).

Figure 7:
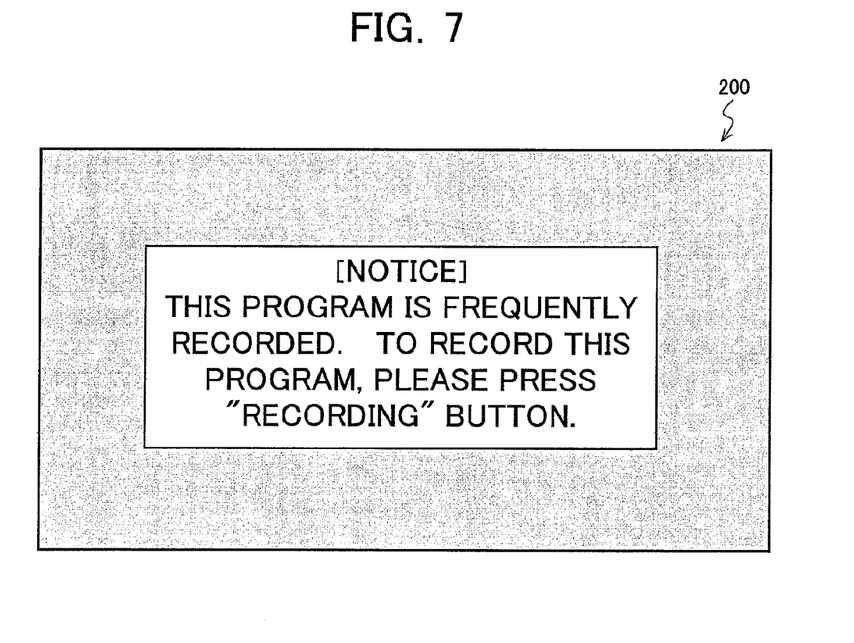
FIG. 7 is a diagram of a display example of a notice screen when a program frequently recorded in the past is selected.

FIG. 7 is a diagram of a display example of the notice screen when the program frequently recorded in the past is selected. If it is determined in the process at the time of selection that the program after the selection is the program frequently recorded in the past, a notice screen 200 as depicted in FIG. 7 can be displayed. This notice screen 200 has a main purpose of informing a viewing user that the selected program is the program frequently recorded on a routine basis. The user can start recording the program after the selection by pressing down the recording button 45 of the remote controller at this point.

As described above, according to this operation example, the information of the program frequently viewed on a routine basis by the user is recorded and retained and, when a selection is made in the display device 10, if the program after the selection is the frequently viewed program, the display is accordingly performed so that a user can certainly record the frequently recorded program. For example, a series of broadcast programs can efficiently be recorded.

OPERATION EXAMPLE 3

In this operation example, the display device enables a plurality of arbitrary programs to be selected in accordance with user's operations while the electronic program guide is displayed, so as to start recording, or make recording reservations of, the selected programs in accordance with user's operations.

Figure 8:
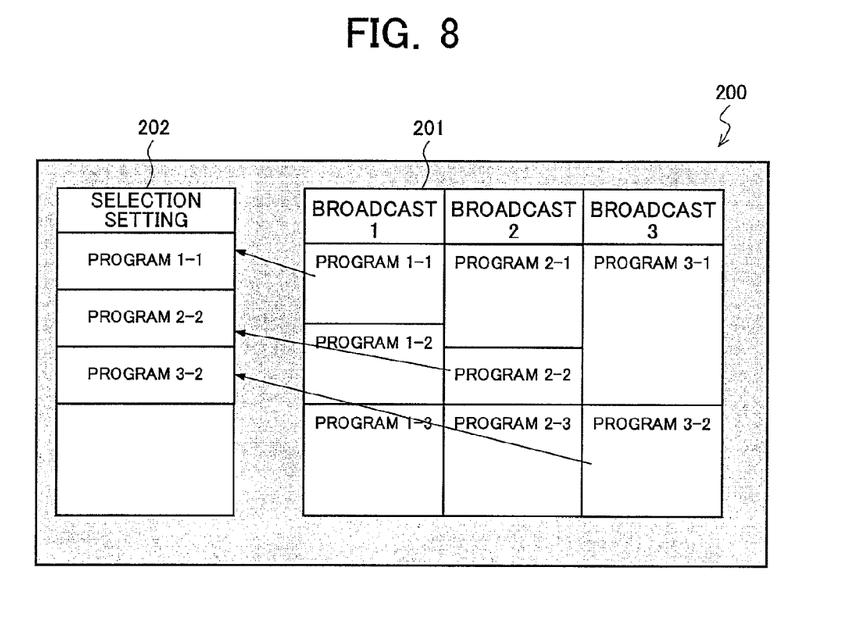
FIG. 8 is a diagram for explaining a third operation control example in the display device according to the present invention.

FIG. 8 is a diagram for explaining a third operation control example in the display device according to the present invention. In this operation example, the electronic program guide conventionally used mainly for recording reservation is used to enable a recording candidate program setting for sequentially recording programs. For this operation, a user can display a recording candidate program setting screen 200 as depicted in FIG. 8 by performing a predetermined operation on the operation input portion such as the remote controller 40. The recording candidate setting screen 200 is provided with an electronic program guide displaying portion 201 and a selection setting portion 202.

In the electronic program guide displaying portion 201, the same conventional electronic program guide can be displayed. The user can select desired program and set the selected programs in the selection setting portion 202 by operating the remote controller 40. A technique of the program selection operation on the electronic program guide is not limited, and a predetermined operating method can preliminarily be determined as needed.

A plurality of programs selected from the electronic program guide can be set in the selection setting portion 202.

As a result, the user can organize desired recording candidate programs in a form of a list in the selection setting portion 202. In the display of the selection setting portion 202, the programs selected by the user are sorted in the order of selection and displayed as a program list. The recording candidate program setting screen 200 displays the electronic program guide of the electronic program guide displaying portion 201 and the selection setting portion displaying the sorted program list at the same time. When the selection setting portion 202 is displayed, the selection setting portion 202 is displayed on the left side of the screen while the displayed electronic program guide displaying portion 202 is displayed in a reduced size on the right side of the screen. This eliminates the effort of selecting a desired program from the electronic program guide in each case.

When recording is actually performed, the user can easily start recording the program by displaying the recording candidate setting screen 200 on the display device 10, pointing the cursor to the desired program in the selection setting portion 202, and pressing down the recording button 45.

Recording reservations can collectively be set for the programs set in the selection setting portion 202. In the case of the recording reservations, the recording reservations can also be made in accordance with predetermined operations and, for example, while the cursor is located on the selection setting portion 202, when the user pressed down the decision button 42, a recording reservation setting screen is displayed, and the recording reservations of the programs set in the selection setting portion 202 can be enabled by selecting and determining the recording reservations on the display screen. The display device 10 sequentially records the programs reserved to be recorded.

With this operation example as described above, preliminarily selected and set programs can collectively be recorded. For example, a series of programs with different broadcast dates, days of week, broadcast times, etc., can collectively be reserved by one reservation operation. In this case, unlike conventional recording reservations, for example, image quality (recording rate) of recording can automatically be set depending on a total time of selected programs. In this case, for example, based on a capacity of a medium such as BD, a process of automatically changing a recording rate can be executed such that all the programs to be recorded can be recorded. A plurality of programs can also be handled and recorded as one program. In this case, a recording pause button etc., can be utilized to perform program editing in real time, such as skipping CM during the program being recorded.

OPERATION EXAMPLE 4

In this operation example, if recording is executed, the display device 10 allows the program to be recorded only when program information, for example, a title, program content, or genre information already recorded in a recording medium such as BD is matched. This enables only the programs having the same program information to be collected and recorded in one recording medium.

Figure 9:
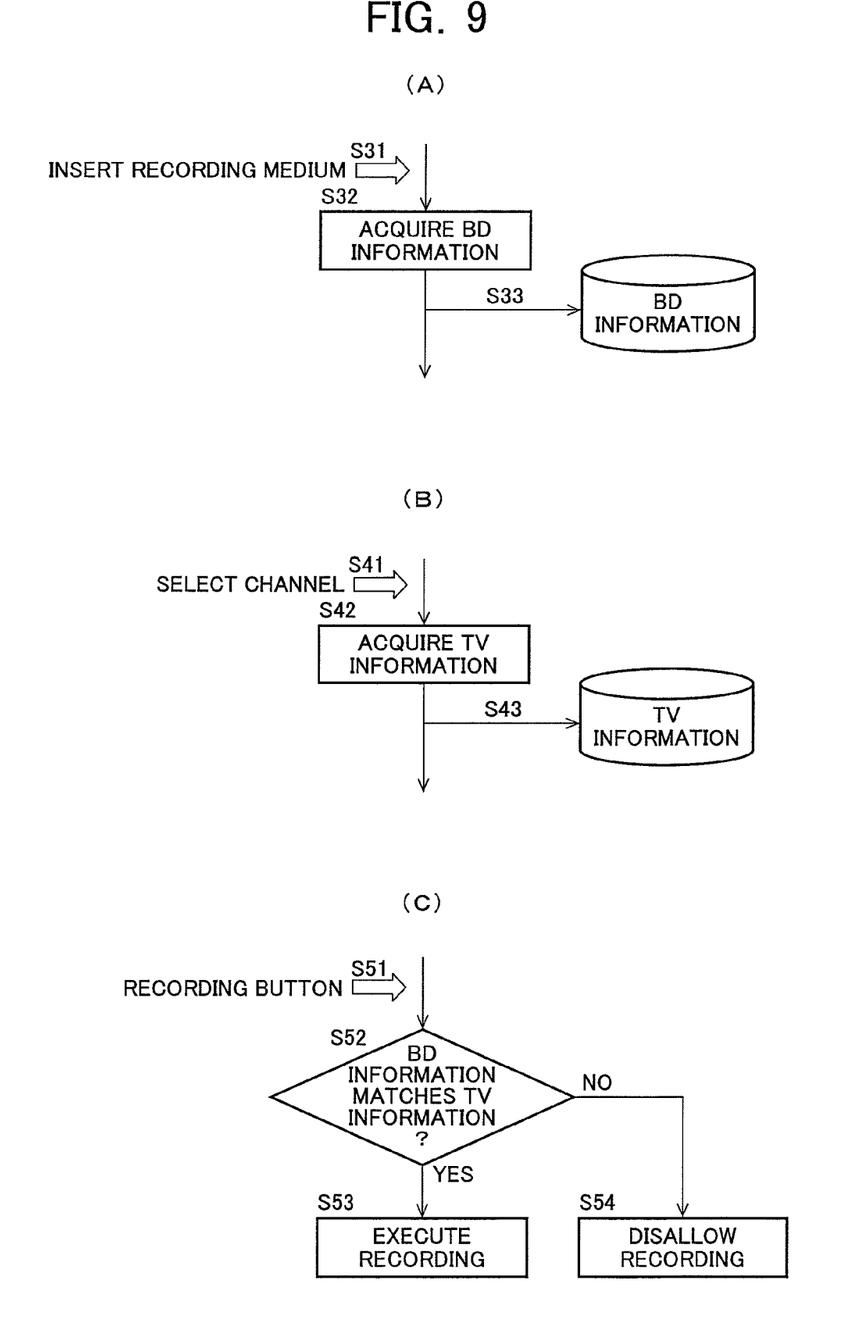
FIG. 9 is a diagram for explaining a fourth operation control example in the display device according to the present invention.

FIG. 9 is a diagram for explaining a fourth operation control example in the display device according to the present invention, FIG. 9(A) is a diagram for explaining an operation example when a recording medium such as BD is inserted, FIG. 9(B) is a diagram for explaining an operation example when a channel is selected in the display device and FIG. 9(C) is a diagram for explaining an operational example when the recording button is pressed down.

In FIG. 9(A), if a recording medium (assumed as BD in this example) is mounted on the drive (the BD drive 22 in this embodiment) of the display device (step S31), the display device 10 acquires BD information thereof (step S32). The BD information is information of a program already stored in BD and consists of a program title and program content information. The program title and the program content information acquired from the BD by the display device 10 are stored and retained in the storage means such as a memory included in the display device (step S33).

Although the information acquired from the recording medium is assumed to consist of the program title and the program content information in this example, the information may be either piece of the information, or information other than these pieces of the information may be defined as needed. For example, genre information, a program start time, a program end time, program viewing appropriateness information, etc., may be used that are provided as service information of digital broadcast.

In FIG. 9(B), when a user operates the remote controller 40 to perform an operation of selecting a program to start viewing or perform an operation of changing a selected program being viewed (step S41), the display device 10 acquires TV information after the selection (step S42). The TV information consists of a program title and program content information included in the service information of broadcast wave. The acquired TV information is stored and retained in the storage means such as a memory of the display device 10 (step S43).

In FIG. 9(C), while previewing a broadcast program on the display device 10, if a user pressed down the recording button 45 of the remote controller 40 (step S51), the display device compares the BD information stored in the storage means with the TV information of the program being viewed (step S52). If the pieces of the information are matched, the recording is executed (step S53) and, if not matched, the recording is not permitted (step S54). If the recording is not permitted, a display screen may be displayed for notifying the user of the non-permission or a display screen may be displayed that prompts the user to insert another medium.

To determine whether the BD information and the TV information are matched, it may be determined that the pieces of the information are matched if the program title is perfectly matched, or it may be determined that the pieces of the information are matched if the program title is partially matched. In the case of partial matching, it may be determined whether the program title is matched for a predetermined amount or more of characters. Although the same applies to the program content information, it may be determined that the program content information is matched when a predetermined keyword is matched in the case of the program content information, for example.

By using the genre information as the BD information and the TV information, only the programs of the same genre can be collected and recorded in one recording medium. If the matching of the genre information is determined, since a genre is represented by a certain genre code, it may be determined whether the genre code is matched. When a large classification and a middle classification of a genre code are matched, it may also be determined that the genre code is matched.

If the BD information recorded in BD and the TV information of the program after the selection are matched on a predetermined condition in accordance with a predetermined criterion, the program is permitted to be recorded. As described above, with this operation example, only the programs conforming to the certain condition can be recorded in the same recording medium.

OPERATION EXAMPLE 5

In this operation example, a program database is searched by using character information recognized from a still image while a broadcast program is viewed or program information acquired from broadcast wave of the broadcast program being viewed, so as to make a program reservation of a corresponding program.

Figure 10:
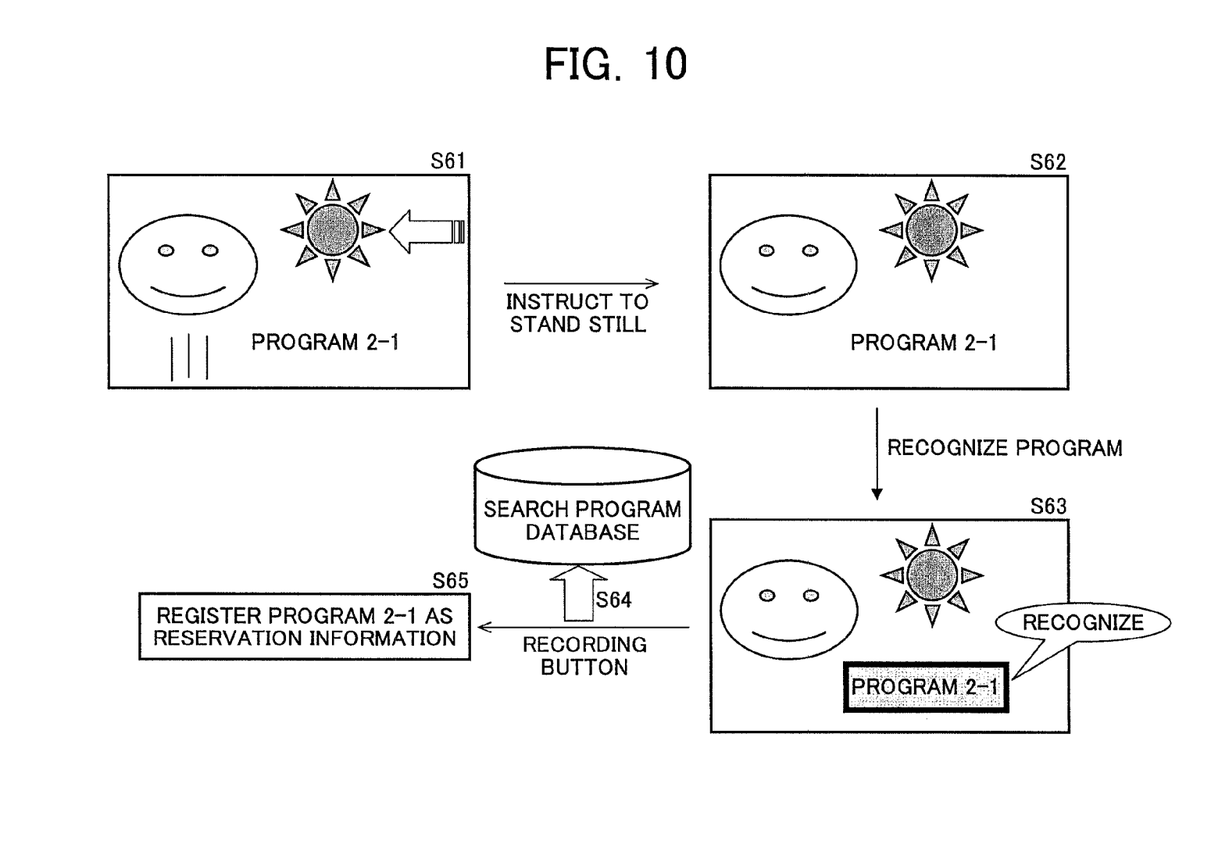
FIG. 10 is a diagram for explaining a fifth operation control example in the display device according to the present invention.

FIG. 10 is a diagram for explaining an operation control example in the display device according to the present invention. It is assumed that a program is previewed on the display device 10 (S61). A predetermined operation on the remote controller 40, etc., causes a shift to a setting mode for making a reservation in accordance with still image acquisition information. A user uses a still image function included in the display device 10 to switch the program being viewed to a still image display state with a predetermined operation (S62).

The display device 10 executes a character recognition processing for the still image being displayed to acquire a program name or program information displayed on the still image as character information. In this example, for example, an image of "PROGRAM 2-1" is recognized as characters and the character information thereof can be acquired (S63). A known technique is applicable to the process of recognizing characters from a character image displaying on a still image to acquire character information of text. For example, still image data can be subjected to data analysis by OCR (optical Character Recognition) software to acquire character information.

If the user presses down the recording button 45 of the remote controller 40 at this point, the program database configured in the storage means such as a memory included in the display device 10 is searched for the character information acquired by the character recognition process of the still image (S64).

The program database corresponds to a program information storage portion of the present invention recording program information that enables reserved recording of a program, and records a program title, program content information, a viewing start time, a viewing end time, etc., of the electronic program guide for each program, for example. When the program database is searched for the character information acquired from the still image, if a program having the information matching the character information exists in the program database, a recording reservation of the program is automatically made. In this example, "PROGRAM 2-1" is registered as the reservation information to execute recording when "PROGRAM 2-1" is actually broadcasted (S65). As a result, the recording reservation can easily be made for the program that matches the character information acquired from the still image.

For example, when a program advertisement of his/her interest is broadcasted, a user makes a shift to the reservation execution mode using the still image acquisition information as described above, and performs an operation of shifting to a still image while a program name is displayed on the screen. As a result, the program name displayed on the screen is recognized as characters and the object program can be retrieved from the program database to make a reservation for recording the retrieved program.

Although the character recognition processing of the still image is executed and the acquired character information is used for searching the program database in the example described above, the program database may be searched by using the program name or the program information acquirable from broadcast wave of the program being viewed or the program information included in data broadcast if the data broadcast exists. In this case, after making a shift through a predetermined operation to a mode of searching the program database to make a recording reservation, a user can operate the recording button at a desired timing to search the program database by using the program information acquirable from the broadcast wave at this timing. The program database may be disposed in an external device connectable through a network, etc., to the display device.

With this operation example as described above, a recording reservation can be made without displaying the electronic program guide.

EXPLANATIONS OF REFERENCE NUMERALS

10 . . . display device; 11 . . . antenna input terminal; 12 . . . viewing tuner; 13 . . . recording tuner; 14 . . . decoder; 15 . . . LCD controller; 16 . . . LCD panel; 17 . . . remote controller light receiving portion; 20 . . . recording unit portion; 21 . . . decoder; 22 . . . BD drive; 30 . . . antenna; 40 . . . remote controller; 41 . . . cursor button; 42 . . . decision button; 43 . . . different-channel program button; 44 . . . broadcast switching button; 45 . . . recording button; 100 . . . different-channel program guide; 200 . . . recording candidate setting screen; 201 . . . electronic program guide displaying portion; and 202 . . . selection setting portion.

The invention claimed is:

1. A display device comprising: a displaying portion that displays an input video; a display control portion that controls display of the displaying portion; a broadcast signal receiving portion that receives a broadcast signal; a recording portion that records the broadcast signal received by the broadcast signal receiving portion; a recording control portion that controls recording of the broadcast signal into the recording portion; an operation input portion that accepts an operation input by a user; a program information recording portion that records program information of the broadcast signal when recording of the broadcast signal is started in accordance with an operation input to the operation input portion; and a high-frequency program information recording portion that records highly frequently recorded program information, wherein when the recording of the broadcast signal is started, the recording control portion compares program information of the broadcast signal starting to be recorded with program information recorded in the program information recording portion, and records the program information of the broadcast signal starting to be recorded in the high-frequency program information recording portion when it is determined that the pieces of the program information are matched in accordance with a predetermined condition, wherein when a selected program displayed on the display device is changed in accordance with an operation input to the operation input portion, the display control portion compares program information of a program after selection with program information recorded in the high-frequency program information recording portion, and displays on the displaying portion a display screen indicating that the program after the selection is a highly frequently recorded program when it is determined that the pieces of the program information are matched in accordance with a predetermined condition.

2. The display device as defined in claim 1, wherein the program information is one or more of program title information, program content information, and genre information provided as service information of digital broadcast.

3. The display device as defined in claim 1, wherein the program information is one or more of program title information, program content information, and genre information acquired by reproducing a recording medium capable of communicating with the display device.

* * * * *